Figure 1:
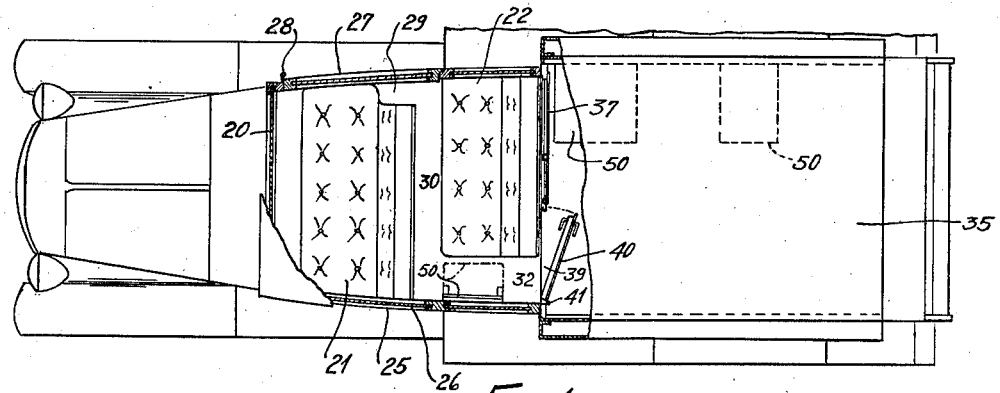

Dec. 8, 1936.      N. P. LARSEN      2,063,388
VEHICLE CONSTRUCTION
Filed Feb. 13, 1936

INVENTOR.
Neil P. Larsen
BY
Bates, Golrick & Teare
ATTORNEYS

Patented Dec. 8, 1936

2,063,388

UNITED STATES PATENT OFFICE 2,063,388

VEHICLE CONSTRUCTION

Neil P. Larsen, Cleveland, Ohio, assignor to American Coach & Body Company, Cleveland, Ohio, a corporation of Ohio Application February 13, 1936, Serial No. 63,755

3 Claims. (Cl. 296—64)

This invention relates to vehicles and especially to an improvement in body constructions for motor vehicles to facilitate their use by public utility companies and the like.

Hitherto, several types of body constructions have been adopted for use by public utility companies, but in many instances they have been constructed by adding a truck or van body to a motor vehicle chassis, which was previously provided with a more or less standard cab construction. Such vehicles are used to provide transportation for workmen, as well as for the transportation of tools and supplies. The cabs have not been large enough to hold all of the workmen and consequently it has been necessary for them to ride in the van where there is scant protection from the wind and temperature. To increase the size of cab to accommodate all of the workmen is not sufficient, because in case of serious accident they would be unable to leave the cab with sufficient rapidity to avoid injury.

At the present time, the area covered by the service vehicles of public utility companies is constantly being increased and hence the time during which the workmen are being transported from place to place is also increased. This, of course, increases the discomfort and danger of such vehicles to the workmen. Likewise, while the present bodies have been built so that tools and equipment are readily accessible, nevertheless they are more or less inconveniently located. Workmen riding in the cab have to leave the vehicle in order to secure tools and other equipment carried by the vehicle, and while in some instances, such inaccessibility is of little matter, nevertheless in emergencies, it is highly desirable that the workmen be able to secure tools and equipment as quickly as possible.

A more specific object of the present invention is to so construct a motor vehicle, as to increase the comfort to the occupants thereof, and to decrease the liability of injury to the person or occupants if an accident should occur. A further object of the invention is to provide a vehicle body construction in which the tools and equipment are more readily accessible to workmen driving or riding in the cab of the vehicle.

Other objects of the present invention will become more apparent from the following description, reference being had to a preferred embodiment of the invention, illustrated in the drawing. The novel features of the invention will be more fully set forth in the claims.

Figure 2:
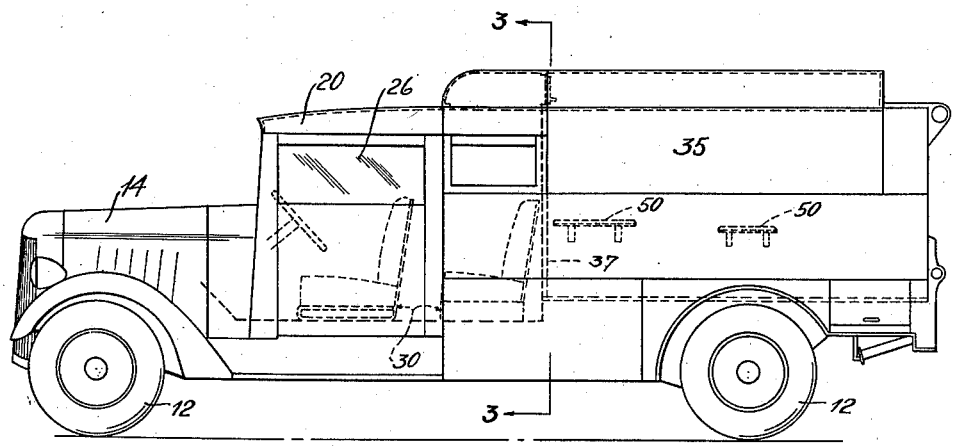
Figure 3:
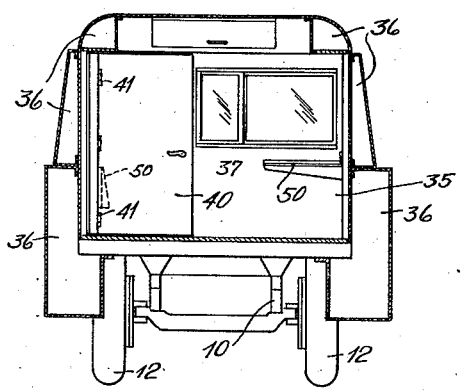
Figure 4:
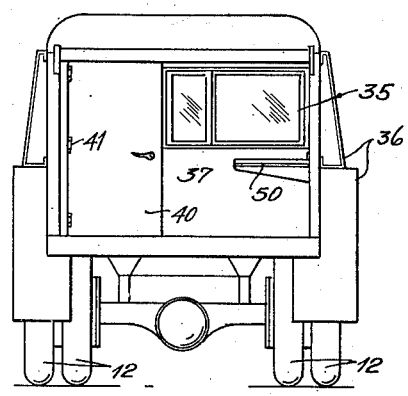

Referring now to the drawing, Fig. 1 is a plan view of a motor vehicle provided with my improved body construction, certain portions of the body being broken as to more clearly illustrate the internal construction thereof; Fig. 2 is a side elevation of the vehicle illustrated in Fig. 1; Fig. 3 is a transverse section, the plane of the section being indicated by the lines 3—3 on Fig. 2 and Fig. 4 is a rear elevation of the vehicle illustrated in Figs. 1 and 3.

My improved body construction is shown on the drawing as incorporated in a motor vehicle having the usual chassis at 10, supported by suitable wheels 12. The vehicle as shown is driven by the usual motor, not shown, but enclosed by a suitable hood 14 at the forward end of the vehicle. To the rear of the motor unit, or over it, I mount on the chassis 10, a cab compartment 20, which is provided with a pair of seats 21 and 22, one disposed to the rear of the other.

From an inspection of Fig. 1, it will be noted that the left hand side of the cab is closed by a wall 25 provided with the usual window 26. The right hand side of the cab is provided with a door 27 slightly deeper than the seat 21 and preferably hinged at its front end as at 28 to a suitable vertical body frame member so as to provide access to both the seats 21 and 22. The back support of the front seat 21 is of less width than the cab, thereby providing a passageway 29 between it in the door 27 so as to enable workmen to quickly pass to or from the seat 21 through the door 27.

The seat 22 is located to the rear of the seat 21 and is spaced a sufficient distance therebeyond to provide a passageway 30 between it and the front seat 21. In the preferred form, the seat 22 is of sufficient width to accommodate two workmen but nevertheless does not extend the full width of the cab stopping short of the cab wall 25 thus providing a passageway 32 which provides access between the cab and body through the opening 39 in the wall 37. These seats, therefore, are arranged in a staggered relationship, as shown in Fig. 1, the front seat having one end disposed closely adjacent the left wall of the body and the rear seat having one end disposed closely adjacent the right hand wall of the body, leaving connecting passageways 29, 30 and 32, between such seats and the opposite body walls.

Storage space for supplies and the like is provided at the rear of the cab, by a suitable body or storage compartment or enclosure 35 having the usual side and top wall members and provided with suitable tool compartments 36. The front end of this body portion is closed by the rear wall 37 of the cab while the rear of the storage compartment 35 is open to provide access thereto from the rear of the vehicle. To facilitate the accessibility of tools and supplies to the workmen, I provide a cab with a door 40 pivoted as at 41 to a suitable upright vehicle frame member, and adapted to swing outwardly relative to the cab into the body portion 35, thus, workmen from either seat 21 or 22 may readily pass between the cab and the storage compartment 35 and leave or enter the cab from the rear of the vehicle.

This seating and cab arrangement provides a body having a maximum degree of safety. It will be noted that as both the doors 27 and 40 open outwardly relative to the cab 20, and as both are hinged or pivotally connected to the body at the corners of the cab, access to the cab may be had, for practical purposes, from either side, or from the front or rear of the vehicle. Thus, in case of an accident which might jam the door 27, the occupants may leave the cab through the door 41, and likewise should the body compartment 35 of the truck be damaged so that it would be dangerous to leave the truck that way, the door 27 may be utilized for the occupants of either the cab or the storage compartment.

In normal use of the vehicle, seats 21 and 22 provide the vehicle with sufficient seating capacity to accommodate the necessary workmen. However, occasional demands are made which require a greater number of workmen than can be accommodated by such seats, and in such instances, the storage compartment may be provided with suitably folding seats 50. Such seats are generally indicated in the drawing as being mounted in the passageway 32 and in the storage compartment 35. The doors 40 and 27 then provide an exit from the truck for occupants of such seats.

From the foregoing description, it will be noted that I have so arranged my vehicle as to make the tool and storage compartments readily accessible to the workmen from the cab without necessitating their leaving the truck and entering the tool compartments from the rear of the truck and I have provided a vehicle body construction, which increases the comfort and safety of the occupants thereof.

I claim:—

1. A vehicle body comprising a unitary structure having a partition therein dividing it into a closed cab compartment, and an open storage compartment, the cab compartment having a driver's seat extending from one side thereof and a second seat extending from the opposite side thereof, the body having a door on one side thereof providing a common entrance to both seats, and the partition having a door therein for providing a passageway between each of the seats and the storage compartment.

2. A vehicle body having a partition therein dividing it into a closed cab compartment and an open storage compartment, there being a driver's seat extending from one side of the cab and terminating short of the other side, and there being a second seat extending from the last named side and terminating short of the first mentioned side, and being spaced from the driver's seat and providing a Z-shaped passageway within the cab, the cab having a door in one side wall affording a common entrance for both seats, and the partition having a door near the end of the rear seat, whereby the occupants in the cab compartment may leave at either one of two substantially diagonally opposite corners.

3. A vehicle body having a transversely extending partition therein dividing it into a closed cab compartment and a storage compartment, the cab compartment having a front seat extending from one side wall and having a rear seat extending from the opposite wall, the last named wall having a door therein for providing access to each seat, and the partition having a door therein for providing a passageway from each seat in the cab to the storage compartment.

NEIL P. LARSEN.